US012561533B1

(12) United States Patent
Best

(10) Patent No.: US 12,561,533 B1
(45) Date of Patent: Feb. 24, 2026

(54) CHATBOTS WITH NON-LINEAR CONVERSATIONS

(71) Applicant: Powerclaim GmbH, Munich (DE)

(72) Inventor: Bastian Best, Munich (DE)

(73) Assignee: Powerclaim GmbH, Munich (DE)

( * ) Notice: Subject to any disclaimer, the term of this patent is extended or adjusted under 35 U.S.C. 154(b) by 0 days.

(21) Appl. No.: 19/308,532

(22) Filed: Aug. 25, 2025

(51) Int. Cl.
| | |
|---|---|
| *G06F 40/35* | (2020.01) |
| *G06F 3/04847* | (2022.01) |
| *G06F 3/0486* | (2013.01) |
| *G06F 40/166* | (2020.01) |
| *G06T 11/20* | (2006.01) |

(52) U.S. Cl.
CPC .......... *G06F 40/35* (2020.01); *G06F 3/04847* (2013.01); *G06F 3/0486* (2013.01); *G06F 40/166* (2020.01); *G06T 11/206* (2013.01); *G06T 2200/24* (2013.01)

(58) Field of Classification Search
CPC .... G06F 40/35; G06F 3/04847; G06F 3/0486; G06F 40/166; G06T 11/206; G06T 2200/24
See application file for complete search history.

(56) References Cited

U.S. PATENT DOCUMENTS

| | | | | |
|---|---|---|---|---|
| 10,628,775 | B2 * | 4/2020 | Gauthier | ............ G06Q 30/0251 |
| 10,901,603 | B2 * | 1/2021 | Boothroyd | ............ H04L 51/216 |
| 10,976,904 | B2 * | 4/2021 | Moran | ................ G06F 3/04842 |
| 11,095,579 | B1 * | 8/2021 | de Mazancourt | ....... G06F 40/40 |
| 11,550,565 | B1 * | 1/2023 | VanAntwerp | ........... H04L 67/02 |
| 12,210,849 | B1 * | 1/2025 | Coursey | .................. G06F 40/58 |
| 2004/0267701 | A1 * | 12/2004 | Horvitz | .................... G06F 16/34 |
| | | | | 707/E17.093 |
| 2005/0154591 | A1 * | 7/2005 | Lecoeuche | .............. G10L 15/30 |
| | | | | 704/E15.047 |
| 2014/0170610 | A1 * | 6/2014 | Ridgeway | .............. G09B 19/06 |
| | | | | 434/156 |
| 2017/0032021 | A1 * | 2/2017 | Watanachote | .......... H04L 51/52 |
| 2017/0228445 | A1 * | 8/2017 | Chiu | ...................... G06F 16/248 |
| 2020/0356237 | A1 * | 11/2020 | Moran | ................... G06F 3/0481 |
| 2021/0105244 | A1 * | 4/2021 | O'Rourke | .............. G06F 9/542 |
| 2022/0043973 | A1 * | 2/2022 | Arroyo | ................. G06F 40/237 |
| 2022/0158962 | A1 * | 5/2022 | Antonov | .............. G06F 40/289 |
| 2022/0360545 | A1 * | 11/2022 | Mingels | ................ G06F 40/166 |
| 2023/0308536 | A1 * | 9/2023 | Tokuchi | ................ H04L 51/226 |
| 2024/0244026 | A1 * | 7/2024 | Qin | ......................... H04L 51/04 |
| 2024/0345573 | A1 * | 10/2024 | Goyal | ................ G05B 23/0281 |
| 2025/0068258 | A1 * | 2/2025 | Sedouram | ............. G06F 3/0236 |

* cited by examiner

*Primary Examiner* — Fariba Sirjani
(74) *Attorney, Agent, or Firm* — Blueshift IP; Robert Plotkin

(57) ABSTRACT

A computer-implemented method manages a non-linear conversation with a chatbot, allowing users to modify their prompts and receive new responses, creating separate conversation paths. The method displays a conversation between a user and the chatbot on a conversational user interface, comprising user prompts and corresponding chatbot responses forming a first conversation path. A user can request a modification to a user prompt, which is then updated on the conversational user interface. The chatbot responds to the modified user prompt in a second conversation path, separate from the first path. This enables users to explore different conversation paths and receive tailored responses from the chatbot. The method facilitates an interactive and adaptive conversation experience, providing a more effective and engaging dialogue.

14 Claims, 6 Drawing Sheets

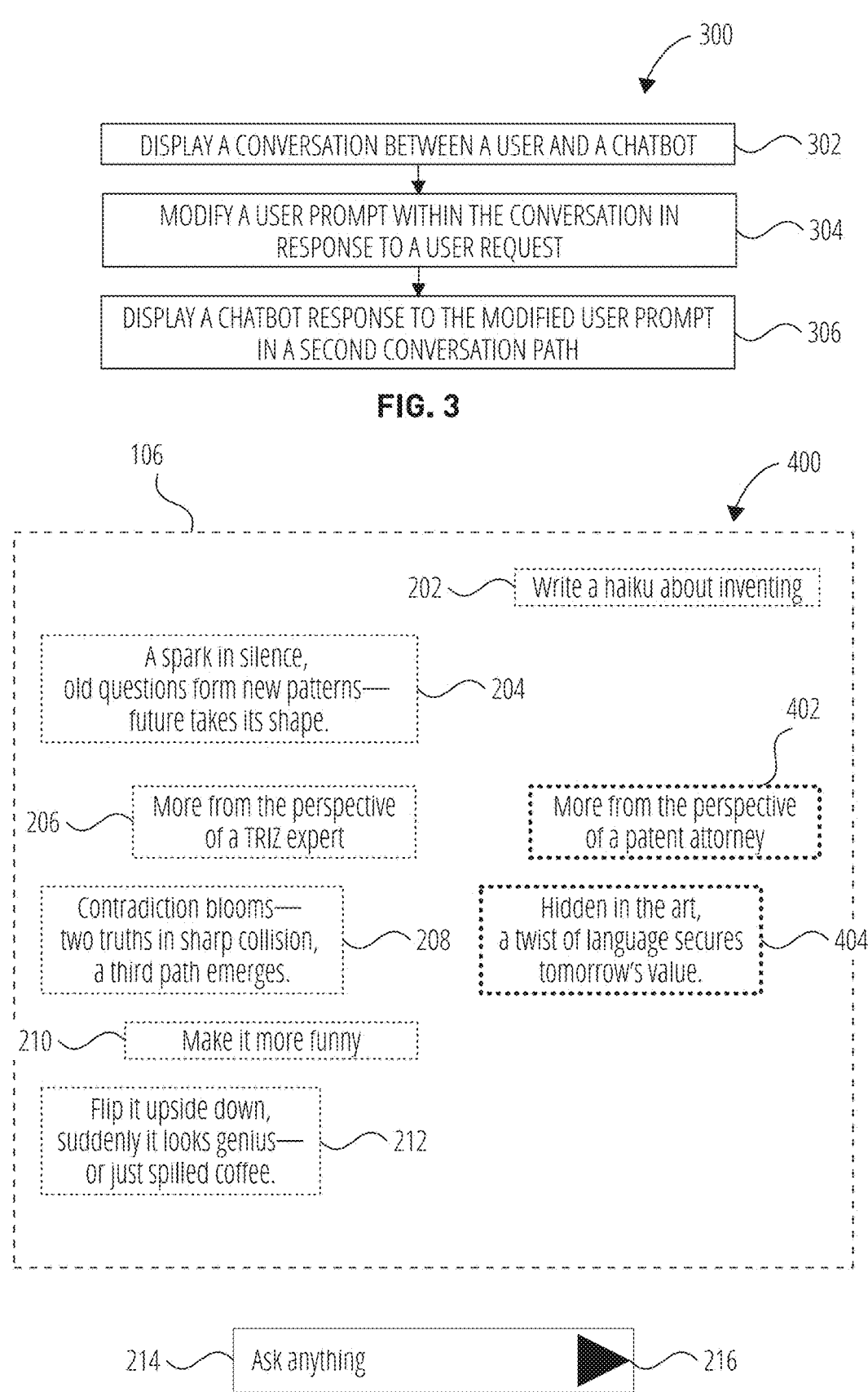

300

| DISPLAY A CONVERSATION BETWEEN A USER AND A CHATBOT | 302 |

| MODIFY A USER PROMPT WITHIN THE CONVERSATION IN RESPONSE TO A USER REQUEST | 304 |

| DISPLAY A CHATBOT RESPONSE TO THE MODIFIED USER PROMPT IN A SECOND CONVERSATION PATH | 306 |

202 — Write a haiku about inventing

A spark in silence,
old questions form new patterns—
future takes its shape.    204

206 — More from the perspective
of a TRIZ expert

402 — More from the perspective
of a patent attorney

Contradiction blooms—
two truths in sharp collision,
a third path emerges.    208

Hidden in the art,
a twist of language secures
tomorrow's value.    404

210 — Make it more funny

Flip it upside down,
suddenly it looks genius—
or just spilled coffee.    212

214 — Ask anything    216

202 — Write a haiku about inventing

A spark in silence,
old questions form new patterns—
future takes its shape.

204

402

206 — More from the
perspective of
a TRIZ expert

More from the perspective
of a patent attorney

Inventor Perspective 602

Lawyer Perspective 604

208

210

Humor level
increase 606

212

Hidden in the art,
a twist of language secures
tomorrow's value.

404

214 — Ask anything        216

CHATBOTS WITH NON-LINEAR CONVERSATIONS

TECHNICAL FIELD

This disclosure relates to the field of conversational user interfaces, and more specifically to managing non-linear conversations with chatbots.

BACKGROUND

Conversational artificial intelligence (AI) systems, commonly known as chatbots, have become increasingly prevalent. These systems enable natural language interaction between humans and machines, allowing users to engage in text-based, voice-based, or multimodal dialogues to accomplish tasks, retrieve information, or simply converse.

As chatbot technology has evolved, interactions have grown more sophisticated and extended in length. Users frequently engage in multi-turn conversations that span multiple topics, contexts, and lines of inquiry. These extended dialogues create a rich repository of information exchange between the user and the chatbot. However, the management of these conversations presents several challenges for both users and developers.

In conventional chatbot interfaces, conversations typically follow a linear progression, with each user prompt followed by a corresponding chatbot response in chronological order. This linear structure mirrors traditional human conversation but may constrain the natural exploration of ideas that often involves revisiting previous points, considering alternatives, or pursuing multiple threads of inquiry simultaneously.

When users wish to explore an alternative approach to a previously discussed topic, they often must choose between starting an entirely new conversation, thereby losing the conversation context established in the original exchange, or attempting to redirect the existing conversation, which can create confusion as the discussion shifts between topics. The management of conversation history and context becomes increasingly complex as conversations lengthen and diversify in subject matter.

Navigation within extended conversations presents additional difficulties. As dialogues grow longer, locating specific information or returning to earlier points of discussion can become cumbersome. Users may need to scroll through numerous exchanges to find relevant information, potentially disrupting their train of thought or workflow.

The organization of conversational content also presents challenges. Unlike structured documents that may be organized with headings, sections, or indices, conversational interfaces typically present information in a simple chronological sequence. This temporal organization may not align with the conceptual or thematic relationships between different parts of the conversation, making it difficult for users to develop a coherent understanding of complex topics discussed across multiple turns.

Context management in extended conversations introduces further complications. As conversations progress, earlier information may become less relevant or even contradictory to the current discussion. However, determining which prior exchanges should influence subsequent responses remains challenging. The chatbot may retain information that is no longer applicable or fail to consider relevant context from earlier in the conversation.

When users wish to compare different approaches or responses to a given user prompt, they typically must issue multiple separate queries and manually compare the results. This process can be inefficient and may not preserve the broader conversational context in which these alternatives are being considered.

Current conversational interfaces often provide limited mechanisms for users to indicate the relative importance of different parts of a conversation or to guide the chatbot's attention to specific prior exchanges. This can result in responses that fail to incorporate critical information or that give undue weight to tangential points.

US 2025/0068258 A1 by Google LLC discloses conversational user interfaces with multimodal inputs and mind map like interactions. It describes a "mind map" chat interface where selecting an earlier prompt and adding a new input creates a non-linear branch with linked user prompts. However, the user interface still maintains a fundamentally linear response flow, failing to fully capture or represent the complexity of non-linear, multi-path conversations. As a result, users are unable to intuitively visualize or manage divergent conversational threads, which can be especially problematic in scenarios involving ambiguous prompts or the need to explore multiple stylistic or contextual options.

Despite ongoing advancements in conversational AI, challenges remain in addressing some of these issues, particularly in developing interfaces that support more flexible and natural patterns of human-computer dialogue while maintaining usability and coherence.

SUMMARY OF THE DISCLOSURE

It is an object of embodiments of the present disclosure to provide advanced conversational interfaces that manage non-linear dialogue flows in chatbot interactions, enabling users to interact more naturally and flexibly. This objective is achieved by the subject-matter defined in the independent claims. Advantageous modifications of embodiments of the present disclosure are defined in the dependent claims as well as in the description and the drawings.

In the first aspect, the present disclosure relates to a method for managing a non-linear conversation with a chatbot. The method may be computer-implemented. A chatbot should be understood as a computer program or artificial intelligence system configured to provide a human-like conversation partner to human users, typically including text or voice interactions.

In embodiments, the method comprises displaying, on a conversational user interface, a conversation between a user and a chatbot. The conversational user interface is preferably a graphical or textual interface that presents the ongoing exchange between the user and the chatbot, allowing the user to input prompts and view responses in real time, i.e., as the conversation unfolds. The conversation may comprise any number, in particular a plurality, of user prompts and any number of corresponding chatbot responses. The user prompts and chatbot responses may form a first conversation path, which may be visualized as a linear structure within the user interface. The phrase "first" conversation path is meant to refer to the initial flow of dialogue, where each user prompt is followed by a chatbot response, and the sequence progresses as the user continues to interact with the chatbot.

In embodiments, the method comprises modifying, on the conversational user interface, a user prompt within the conversation. The modifying may occur in response to a user request. Accordingly, the method enables the user to modify a previously entered user prompt within the conversation. The user request may comprise actions such as selecting a user prompt and editing its content.

In embodiments, the method comprises displaying, on the conversational user interface, a chatbot response to the modified user prompt. Accordingly, upon modification of the user prompt, a new chatbot response is generated for the modified prompt and displayed on the conversational user interface.

In embodiments, the chatbot response to the modified user prompt is displayed in a second conversation path separate from the first conversation path. Preferably, the second conversation path is newly generated in response to the modification of the user prompt. The phrase "second" conversation path is meant to refer to a conversation path that is visually distinguishable by the user when it is displayed on the conversational user interface. When the second conversation path is presented separately from the first conversation path, this allows the user to view both the original and the modified dialogue flows.

The separation of conversation paths within the conversational user interface greatly facilitates the management of non-linear conversations. Users can explore alternative dialogue scenarios by modifying previous prompts and observing the resulting chatbot responses, without losing the sequence and context of the original conversation. This approach enhances the flexibility and usability of chatbot systems, particularly in applications where users may wish to revisit and revise earlier parts of the conversation to achieve different outcomes or clarify information. By enabling the modification of prior prompts and the creation of distinct conversation paths, the method provides a more dynamic and user-driven conversational experience.

The disclosed user interface and processing scheme provide a computer-implemented mechanism that credibly assists the user in performing a technical task by means of a continued and guided process of human-machine interaction. A prior user prompt within an ongoing conversation can be edited; in response, the system creates a separate ("second") conversation path and renders a corresponding chatbot response in that second path while preserving and concurrently displaying the original ("first") conversation path. Further, a subsequent user prompt may be appended to either the first conversation path or the second conversation path depending on which one is selected as an active conversation path. In one embodiment, the second conversation path is automatically selected as the active conversation path, so that a subsequent user prompt is appended to the second conversation path. In embodiments, the user may change which of the paths should be the active conversation path, in response to corresponding user input. These features control the machine's downstream computation in a deterministic, state-aware manner. This non-destructive branching and path-bound continuation constitute a specific input protocol and state-management scheme that changes how the computer accepts, disambiguates, and processes inputs over time, rather than merely altering the visual appearance of information.

The disclosed arrangement produces objective, machine-verifiable technical effects. First, state integrity is improved because the original ("first") conversation path remains preserved; destructive overwrites are avoided and prior states are reproducibly restorable. Second, input accuracy is increased when subsequent prompts are unambiguously bound to the selected, active path, reducing mis-binding and erroneous processing in the wrong context. Third, interaction efficiency is improved because the user can reach a desired alternative dialog state with fewer steps by selecting and continuing the appropriate branch at the fork, as opposed to reconstructing conversation history. Fourth, internal computer functioning can be enhanced through technical implementations that naturally support the branching interface: a conversation-graph data structure (e.g., a directed acyclic graph with shared prefixes and branch identifiers) can facilitate functional access to state and can control system operation; delta inference and reuse of cached model state for shared prefixes can reduce compute, memory traffic, and latency; streaming only delta tokens to the client can reduce bandwidth; and platform-aware load distribution (e.g., scheduling generation on accelerators while maintaining UI and branch management on CPU threads) can improve resource utilization and throughput. Optional embodiments may include branch-scoped write permissions and transactional updates to prevent race conditions and lost updates under concurrency, further improving robustness. Where the interface accepts voice input, mapping speech to text to form the edited or subsequent prompts is itself a technical process that integrates with the overall guided interaction. The combined effect is a causally linked improvement in computer operation (lower latency, reduced bandwidth and compute, higher throughput, improved concurrency safety) and in the reliability of the human-machine interaction (fewer state-loss incidents, fewer input-binding errors), all arising from the claimed mechanisms of non-destructive branch creation, concurrent path rendering, and/or explicit path-bound continuation.

From a computer-technology standpoint, the disclosed approach improves the functioning of the computer itself and of its user interface. The non-linear conversation comprising a first conversation path and a second conversation path implies a specific data structure that provides faster retrieval of dialog state and more efficient storage/transmission through reference-based updates; an explicit branch identifier can form a machine-interpretable constraint that governs subsequent processing flows; delta generation and cache reuse can provide measurable reductions in end-to-end latency and compute; and architecture-aware task partitioning can improve system throughput. These improvements are not mere automation of a mental process or abstract organization of human activity; rather, they are achieved by particular technical means that control how the computer captures, stores, retrieves, and processes conversational inputs and states over time.

Accordingly, the disclosed embodiments provide technical character and a technical contribution by defining specific computer-implemented mechanisms for input handling, state management, concurrent rendering, and resource-efficient processing that credibly assist the user in a continued and guided human-machine interaction. These mechanisms yield objectively verifiable improvements in internal computer functioning and in interaction reliability. The claims recite a specific improvement to computer interfaces and data handling, integrated into a practical application and comprising significantly more than generic computer implementation.

In embodiments, the first conversation path and the second conversation path may be displayed simultaneously on the conversational user interface. This allows users to view and compare multiple conversation threads at once, enhancing context awareness.

In embodiments, the simultaneous display may be achieved by rendering the paths in vertical and/or adjacent sequences within the conversational user interface. Each sequence may list, in order, the user prompts and corresponding chatbot responses of the respective path.

In embodiments, the first conversation path and the second conversation path may be displayed as a tree structure.

This visualization clarifies the relationship between different conversation branches and makes navigation more intuitive.

In one implementation, the tree structure may comprise a root node corresponding to an initial user prompt of the conversation and/or a child node for each subsequent chatbot response and user prompt. The modified user prompt may be arranged on a branch representing the second conversation path. The branch may extend from a branch representing the first conversation path. The user interface may visually distinguish different branches, for example, using lines, connectors, color coding and/or a positioning of the user prompts and chatbot responses.

In embodiments, creation of the second conversation path automatically selects the second conversation path as an active conversation path, and a subsequent user prompt is appended to whichever conversation path is currently selected as the active conversation path until the user changes the selection via a path-selection control displayed on the conversational user interface.

In embodiments, the first conversation path and the second conversation path may be both displayed in an expanded state. This provides comprehensive visibility of all conversation branches simultaneously, enabling better comparison and analysis.

In embodiments, the method may further comprise transferring a display of the first conversation path to a collapsed state while the second conversation path is displayed in an expanded state. This reduces visual clutter while maintaining focus on the currently relevant conversation branch. In one implementation, the collapsed state may comprise displaying, instead of the user prompts and chatbot responses of a conversation path, one or more of: a summary, a representative element (e.g., the initial user prompt or a branch point), or a symbolic representation of at least part of the user prompts and chatbot responses of the branch.

In embodiments, in the collapsed state, the first conversation path may be represented by a summary element or other minimized representation. Detailed nodes of that path may be omitted from layout and drawing until expansion, thereby reducing rendering workload and memory usage.

In embodiments, the method may further comprise automatically generating, for a user prompt, a plurality of alternative chatbot responses and presenting each alternative in a respective, simultaneously visible conversation branch. Each alternative may be characterized by a distinct style parameter selected from a predefined set. A selector may be provided enabling continuation of any one of the branches while retaining the others.

In embodiments, the method may further comprise displaying, on the conversational user interface, at least one first label associated with the first conversation path and/or at least one second label associated with the second conversation path. This improves navigation and identification of different conversation threads through clear visual markers.

In embodiments, at least one of the first label or the second label may be a chatbot-generated label. This automates the organization process and reduces cognitive load on users by providing AI-generated context cues.

In certain implementations, the chatbot-generated label reflects the subject matter, intent, and/or distinguishing feature of the corresponding conversation path, such as summarizing the user's modified prompt or highlighting a key topic discussed in that path. The chatbot-generated label may be user-customizable.

In embodiments, at least one of the first label or the second label may be a user-generated label. This gives users control over how conversation branches are categorized and provides personalized organization.

In embodiments, the method may further comprise maintaining distinct conversation contexts for the first conversation path and the second conversation path. This ensures contextual integrity across branches, preventing cross-contamination of topics and improving response relevance.

In one implementation, a conversation context comprises a set of background information, knowledge, and/or state associated with the corresponding conversation path. This may include one or more of: a conversation's retained variables, topics, or prior discussion history that apply to the conversation path's subsequent chatbot responses.

In embodiments, the method may further comprise receiving a user request to merge the second conversation path into the first conversation path. The method may further comprise generating a merged conversation context. The method may further comprise displaying, on the conversational user interface, a subsequent chatbot response in a merged conversation path based on the merged context. This allows for the integration of insights from multiple conversation threads while maintaining a coherent dialogue.

In embodiments, generating the merged conversation context may comprise generating an automated summary of the second conversation path and injecting the summary into a conversation context of the first conversation path. This efficiently combines information without overwhelming the context window, preserving key insights while reducing token usage.

In embodiments, the user request to merge may be received via a drag-and-drop operation of a user prompt or a chatbot response from the second conversation path to the first conversation path on the conversational user interface. This provides an intuitive and direct manipulation interface for managing conversation flow, enhancing usability.

In embodiments, the method may further comprise receiving a user selection to exclude selected user prompts or chatbot responses from a current conversation context. The method may further comprise generating a subsequent chatbot response based only on included prior user prompts and chatbot responses. This enables focused conversations by removing irrelevant or outdated information, improving response quality and relevance.

In embodiments, the method may further comprise displaying a navigable timeline slider representing the conversation. The timeline slider may comprise nodes for the first conversation path and/or the second conversation path. The slider may be configured to navigate the display to any user prompt or chatbot response on any conversation path. This creates a visual temporal map of the conversation, enabling rapid navigation across complex branching dialogues.

In embodiments, the timeline slider may include a plurality of visual tick marks. Each tick mark may correspond to one of a key message or summary within the conversation. This highlights significant moments in the conversation history, enabling efficient review and navigation to critical points.

In embodiments, the method may further comprise displaying a semantic map of the conversation. The semantic map may comprise a plurality of nodes clustered by topic. Each node may represent a group of related user prompts and chatbot responses from one or more conversation paths. This organizes information by conceptual relationships rather than chronology, revealing thematic connections across different branches.

In embodiments, the method may further comprise receiving a user selection of two or more conversation paths, including the first conversation path and the second conversation path. The method may further comprise receiving a respective weight for each of the selected conversation paths. The method may further comprise generating a consensus chatbot response by synthesizing content from the selected conversation paths according to their respective weights. This enables nuanced control over how multiple conversation threads influence the final output, producing balanced responses that incorporate diverse perspectives.

In embodiments, the method may further comprise displaying the consensus chatbot response with inline provenance indicators that link portions of the consensus response to their source conversation path. This creates transparency by showing which parts of the response derive from which conversation branches, building trust and facilitating verification.

In embodiments, the method may further comprise inserting a capsule thread. The capsule thread may open a side panel decoupled from the main conversation context for up to a predetermined number of back-and-forth turns. The capsule thread may compress to a single inline capsule icon, possibly with a pinned excerpt and/or unread-count badge when closed. The method may comprise excluding the capsule content from the main branch unless explicitly merged.

In embodiments, off-screen segments of the conversation paths are virtualized such that they are not rendered or transmitted until scrolled into view, thereby reducing rendering workload, memory usage and network bandwidth.

Another aspect of the present disclosure relates to a data processing system, apparatus or device. The data processing system, apparatus or device may comprise means for carrying out any combination of steps of the described methods. The data processing system, apparatus or device may comprise a display. The data processing system, apparatus or device may comprise at least one processor. The data processing system, apparatus or device may comprise a memory. The memory may store instructions that, when executed by the at least one processor, cause the system to carry out any combination of steps of the described methods. The method may comprise displaying, on a conversational user interface, a conversation between a user and a chatbot, the conversation comprising a plurality of user prompts and corresponding chatbot responses forming a first conversation path. The method may comprise modifying, on the conversational user interface, a user prompt within the conversation in response to a user request. The method may comprise displaying, on the conversational user interface, a chatbot response to the modified user prompt, the chatbot response to the modified user prompt being displayed in a second conversation path separate from the first conversation path.

Another aspect of the present disclosure relates to a computer program. Another aspect of the present disclosure relates to a non-transitory computer-readable medium having stored thereon a computer program. In both cases, the computer program may comprise instructions which, when the program is executed by a computer, such as the mentioned data processing system, apparatus or device, cause the computer to carry out any combination of steps of the described methods. The method may comprise displaying, on a conversational user interface, a conversation between a user and a chatbot, the conversation comprising a plurality of user prompts and corresponding chatbot responses forming a first conversation path. The method may comprise modifying, on the conversational user interface, a user prompt within the conversation in response to a user request.

The method may comprise displaying, on the conversational user interface, a chatbot response to the modified user prompt, the chatbot response to the modified user prompt being displayed in a second conversation path separate from the first conversation path. A computer program may also be referred to as a program, software, a software application, an app, a module, a software module, a script, or code. A computer program may be written in a programming language, including compiled or interpreted languages. A computer program may be deployed in any form, including as a stand-alone product or as a module, component, subroutine, or other unit suitable for use in a computing environment, such as on the mentioned data processing system, apparatus or device.

It is an advantage of embodiments of the present disclosure that multiple alternative conversation paths can be preserved concurrently, thereby maintaining state integrity and enabling reproducible restoration of prior dialog states as an objective, machine-verifiable effect.

It is a further advantage of embodiments of the present disclosure that a user can navigate among divergent dialogue branches with fewer interaction steps, such as via path-aware selection controls, providing a guided human-machine interaction that reduces input mis-binding and accelerates access to the intended state.

It is a further advantage of embodiments of the present disclosure that revisions to earlier prompts no longer erase or obscure subsequent exchanges, since non-destructive branching prevents overwriting and preserves data consistency and auditability.

It is a further advantage of embodiments of the present disclosure that structured visualization of conversation paths enhances overall clarity by maintaining overview while allowing focused detail, thereby resolving screen-real-estate constraints and improving retrieval time.

It is a further advantage of embodiments of the present disclosure that clutter within lengthy chats can be reduced by selectively collapsing portions of the dialogue, lowering rendering workload, memory use, and bandwidth for off-screen segments.

It is a further advantage of embodiments of the present disclosure that individual branches can retain isolated contextual state to prevent cross-contamination of information, such as by using explicit branch identifiers and scoped context windows for deterministic processing.

It is a further advantage of embodiments of the present disclosure that users can explore alternative solutions in parallel without duplicating manual effort and thus with less input, i.e., human-computer interactions, reduce redundant computation and latency.

It is a further advantage of embodiments of the present disclosure that retrieval of relevant information is facilitated through organized labeling of conversation segments, which functions as indexing to reduce search complexity and access latency.

It is a further advantage of embodiments of the present disclosure that merging separate branches can provide a unified perspective when desired, with deduplication and reconciliation yielding a consistent state representation and fewer redundant data transfers.

It is a further advantage of embodiments of the present disclosure that selective inclusion or exclusion of prior messages allows focused continuation of the dialogue, producing a deterministic context window that can reduce model inference latency and error rates.

It is a further advantage of embodiments of the present disclosure that navigation controls can offer rapid traversal through the conversation history using jump indices and virtualization, thereby reducing interaction events and redraws.

It is a further advantage of embodiments of the present disclosure that semantic grouping of related messages supports thematic understanding through clustering that improves retrieval ranking and can compress representation for efficient storage and transmission.

It is a further advantage of embodiments of the present disclosure that maintaining discrete branches promotes more reliable and consistent chatbot responses by preserving a stable, unambiguous context, thereby reducing variance and processing errors.

It is a further advantage of embodiments of the present disclosure that resource consumption can be optimized by processing only the active branch context, reducing CPU/GPU compute, memory bandwidth, and network I/O, and thus improving throughput and latency.

It is a further advantage of embodiments of the present disclosure that consensus synthesis from multiple branches can assist users in making informed decisions through algorithmic aggregation (e.g., ranking, voting, deduplication) that reduces manual cross-checks and streamlines data processing.

It is a further advantage of embodiments of the present disclosure that enhanced traceability of conversation evolution is provided for audit or review purposes, such as by using immutable branch identifiers and provenance logs to enable reproducible replays and forensic analysis.

It is a further advantage of embodiments of the present disclosure that the user's creative exploration is encouraged through easy branching and recombination of ideas, with optional shared-prefix reuse and delta storage lowering compute and storage overhead per alternative.

It is a further advantage of embodiments of the present disclosure that overall user satisfaction is increased through improved control and transparency of the conversational experience, evidenced by objective metrics such as fewer state-loss incidents, lower latency and bandwidth, and higher robustness delivered by the foregoing technical means.

The terms used herein should generally be construed as understood by the average person skilled in the art, unless explicitly indicated otherwise. The following explanations may guide the understanding:

As used herein, and unless otherwise specified, the phrase "computer-implemented method" refers to a sequence of operations which is at least partly carried out by one or more processors under the control or direction of computer-executable instructions. Examples include algorithms running on servers, personal computing devices, or cloud-based systems that execute software routines or services to perform specified tasks.

As used herein, and unless otherwise specified, the phrase "managing a non-linear conversation" refers to coordinating and overseeing a conversation that includes branching or multiple conversation paths, such that a user can revisit and alter parts of the conversation and create distinct but related threads. Examples include allowing users to modify an earlier prompt to start a new path, merge separate paths into one thread, or selectively include or exclude certain prompts.

As used herein, and unless otherwise specified, the term "chatbot" refers to a software-based conversational agent capable of interpreting user inputs and providing responses using techniques that may include rule-based processing, natural language processing, artificial intelligence, machine learning or (large) language models. Examples include chatbots deployed on messaging platforms, embedded in mobile applications, or integrated into websites.

As used herein, and unless otherwise specified, the term "conversation" refers to an exchange of messages between a user and a chatbot. Such exchanges generally include user inputs (user prompts) and corresponding chatbot outputs (chatbot responses). In some embodiments, a conversation may be stored or displayed as a chronological sequence, while in others it may be displayed in a branched format.

As used herein, and unless otherwise specified, the phrase "conversational user interface" refers to a graphical or text-based interface that presents interactions between a user and a chatbot. This interface can display user prompts, chatbot responses, and related controls that allow the user to navigate, modify, or manage the conversation. Examples include web-based chat windows, mobile application chat interfaces, and standalone desktop chat applications.

As used herein, and unless otherwise specified, the term "user prompt" refers to any user-provided input, such as a question, command, or statement, directed to the chatbot. Examples include text typed into a chat window, voice commands transcribed into text, or menu selections that direct the chatbot to perform a specific task.

As used herein, and unless otherwise specified, the term "chatbot response" refers to any output generated by the chatbot in reaction to one or more user prompts. This output can be text, speech, images, suggestions, or other forms of content. Examples include direct answers, clarifying questions, or action confirmations.

As used herein, and unless otherwise specified, the phrase "conversation path" refers to a sequence of user prompts and chatbot responses that follows a particular logical or thematic flow. A conversation may have multiple paths that diverge from a common starting point or from intermediate conversation prompts. Examples include branching discussions where a user modifies an earlier question or where the chatbot offers multiple topics to explore.

As used herein, and unless otherwise specified, the phrase "first conversation path" refers to an initial or primary sequence of user prompts and chatbot responses before any additional or alternative branches are created. Examples include the main thread of dialogue between a user and the chatbot from the earliest prompt to the latest response in that thread.

As used herein, and unless otherwise specified, the phrase "second conversation path" refers to a distinct or alternative sequence of user prompts and chatbot responses that deviates from another path. This path may begin at any point in an existing sequence of interactions. Examples include a path initiated when a user revisits and amends a previous prompt, creating a new line of discussion that both coexists with and is separate from an earlier path. In certain scenarios, the second conversation path may also comprise the user prompts and chatbot responses leading up to the previous amended prompt, so that the initial user prompts and chatbot responses that existed before creation of the additional branch are considered to belong to both paths.

As used herein, and unless otherwise specified, the term "displaying" refers to visually rendering content on a screen or other presentation medium, enabling a user to perceive the conversational user interface, user prompts, chatbot responses, conversation paths, labels, or other relevant information. Examples include showing text, icons, graphical elements, or interactive components on a computer display, mobile screen, or head-mounted or otherwise wearable device.

As used herein, and unless otherwise specified, the term "modifying" refers to changing the content, structure, or parameters of a user prompt or other conversation element. Such modification may involve editing text, adding additional data, or partially removing or updating existing information. Examples include altering the wording of a user prompt to refine a request or appending new details to an earlier prompt to adjust the chatbot's subsequent responses.

As used herein, and unless otherwise specified, the phrase "tree structure" refers to a visual or conceptual arrangement of elements in a branched or hierarchical layout, where each node may branch into one or more child nodes. Examples include a diagram of conversation paths originating from a single root prompt and extending into multiple branching prompts and responses.

As used herein, and unless otherwise specified, the phrase "expanded state" refers to a display mode in which all or most elements of a conversation path or structure are visible to the user. Examples include viewing every prompt and response in a conversation tree without any hidden or collapsed branches, at least those currently within the display.

As used herein, and unless otherwise specified, the phrase "collapsed state" refers to a display mode in which certain elements of a conversation path or structure are hidden or summarized. Examples include a minimized conversation node that shows only a graphic symbol, or a high-level summary or partial preview of the topics within that node.

As used herein, and unless otherwise specified, the term "label" refers to a textual or graphical marker associated with a conversation path, node, or segment. Labels may identify or categorize conversation content, topics, or context.

As used herein, and unless otherwise specified, the phrase "chatbot-generated label" refers to a label automatically created by the chatbot or an associated algorithm, based on analysis of conversation content or topics. Examples include a machine-learning-generated tag such as "Shipping Delay" when the conversation pertains to delivery issues.

As used herein, and unless otherwise specified, the phrase "user-generated label" refers to a label added or specified by a user to categorize or annotate conversation content. Examples include a user typing in a custom tag such as "Urgent Matter" or "Follow-Up Request."

As used herein, and unless otherwise specified, the phrase "conversation context" refers to a set of background information, knowledge, or state associated with a conversation path or branch, preferably kept separate from other paths. Examples include a conversation's retained variables, topics, or prior discussion history that apply to that path's subsequent chatbot responses.

As used herein, and unless otherwise specified, the phrase "merged conversation context" refers to a combined set of information from two or more previously separate conversation paths or contexts, so that subsequent prompts or responses can draw upon the aggregated information. An example includes taking the key points from a secondary conversation path and integrating them into the main path's contextual knowledge, thereby enabling the chatbot to respond with a unified perspective.

As used herein, and unless otherwise specified, the phrase "automated summary" refers to a condensed representation of content generated by an automated process to highlight key elements, topics, or themes without reproducing the entire text. Examples include an AI-based summary that extracts the main requests and answers from a lengthy conversation branch.

As used herein, and unless otherwise specified, the phrase "current conversation context" refers to the active or relevant historical data the chatbot uses when generating a response. Examples include the most recent user prompts and chatbot responses that remain included in the conversation's reasoning scope.

As used herein, and unless otherwise specified, the phrase "navigable timeline slider" refers to an interactive user interface element that displays a chronological or logical series of nodes or markers corresponding to relevant points in one or more conversation paths. Examples include a horizontal bar with tick marks representing pivotal user prompts or chatbot responses, navigable by dragging to a specific marker to revisit or inspect the associated conversation state.

As used herein, and unless otherwise specified, the term "semantic map" refers to a visual or data-oriented representation of topics or themes within a conversation, where related content is grouped or clustered according to contextual similarities. Examples include a topology of nodes arranged by deep-learning-based clustering, in which nodes representing similar subjects appear closer together.

As used herein, and unless otherwise specified, the term "node" refers to a point or cluster in a representation of a conversation, such as a semantic map or tree structure. Each node may represent one or more user prompts and chatbot responses, or a set of related conversation content. Examples include a node labeled "Pricing Updates" that contains all relevant user requests and responses discussing updated pricing models.

As used herein, and unless otherwise specified, the phrase "consensus chatbot response" refers to a single response synthesized by analyzing multiple conversation paths, each with its own content or viewpoints, potentially weighted by importance or relevance. Examples include generating a merged reply that incorporates the ideas or solutions presented in distinct threads, yielding a unified answer that reflects each thread's significance.

As used herein, and unless otherwise specified, the phrase "inline provenance indicators" refers to annotations embedded within a chatbot's response that identify the originating path or source of specific pieces of information. Examples include small reference markers, color-coded highlights, or hyperlinks that link a phrase in a consolidated answer to one of the original conversation paths.

Particular and preferred aspects of the present disclosure are set out in the accompanying independent and dependent claims. Features from the dependent claims may be combined with features of the independent claims and with features of other dependent claims as appropriate and not merely as explicitly set out in the claims.

The above and other characteristics, features and advantages of the present disclosure will become apparent from the following detailed description, taken in conjunction with the accompanying drawings, which illustrate, by way of example, the principles of the disclosure. This description is given for the sake of example only, without limiting the scope of the disclosure.

BRIEF DESCRIPTION OF THE DRAWINGS

The present disclosure may be better understood by reference to the following drawings:

FIG. 3 illustrates a method for managing a non-linear conversation with a chatbot in accordance with one embodiment.

FIG. 4 illustrates an example conversational user interface displaying a portion of a non-linear conversation between a user and a chatbot in accordance with one embodiment.

DETAILED DESCRIPTION

In the following, representative embodiments illustrated in the accompanying drawings will be explained. It should be understood that the illustrated embodiments and the following descriptions refer to examples which are not intended to limit the embodiments to one preferred embodiment.

Various embodiments disclosed herein introduce non-linear conversations with a chatbot, allowing users to modify their prompts and receive new responses, creating separate conversation paths. In a first conversation path, a user can request a modification to a user prompt, which is then updated on the conversational user interface. The chatbot responds to the modified user prompt in a second conversation path, separate from the first path. This enables users to explore different conversation paths and receive tailored responses from the chatbot. This way, various embodiments facilitate an interactive and adaptive conversation experience, providing a more effective and engaging human-machine interaction.

Figure 1:
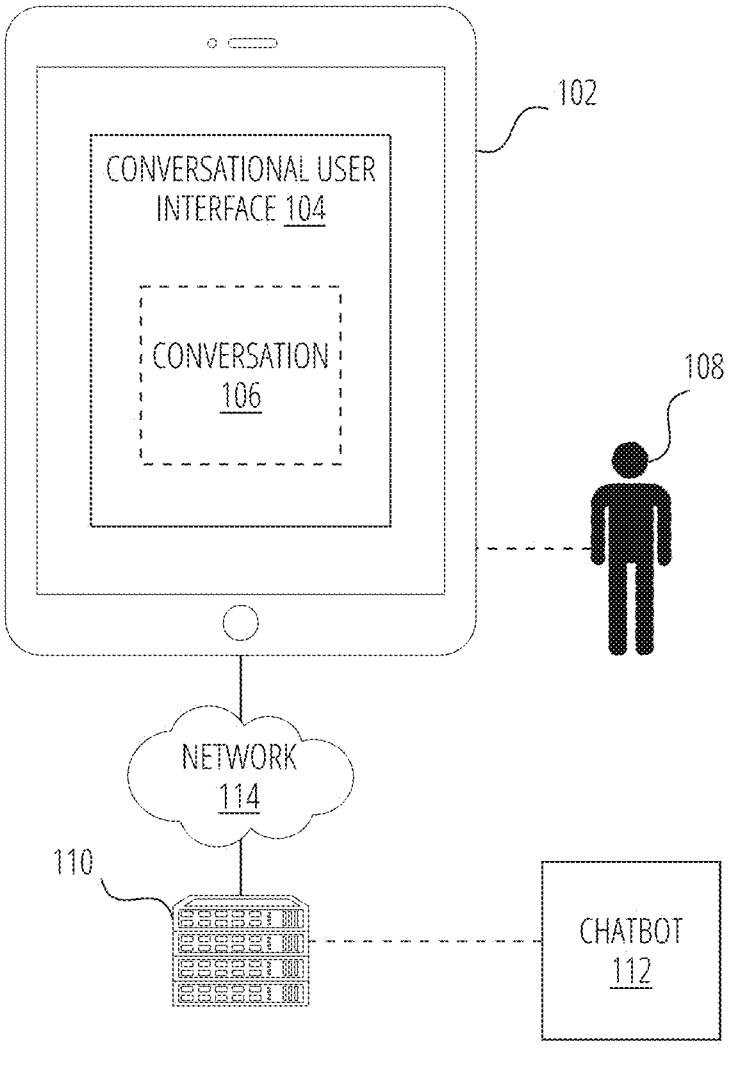
FIG. 1 illustrates a schematic view of a system with a chatbot for providing a conversational user interface on a user device in accordance with one embodiment.

FIG. 1 illustrates a schematic view of a system with a chatbot for providing a conversational user interface on a user device in accordance with one embodiment. In the illustrated system, a user device 102 presents a conversational user interface 104 on its display. The conversational user interface 104 renders a conversation 106 between a user 108 and a chatbot 112. The user device 102 communicates over a network 114, e.g., the Internet, with backend computing resources, including a data processing system 110 that hosts the chatbot 112. In operation, the chatbot 112 is configured to generate chatbot responses to user prompts.

Figure 2:
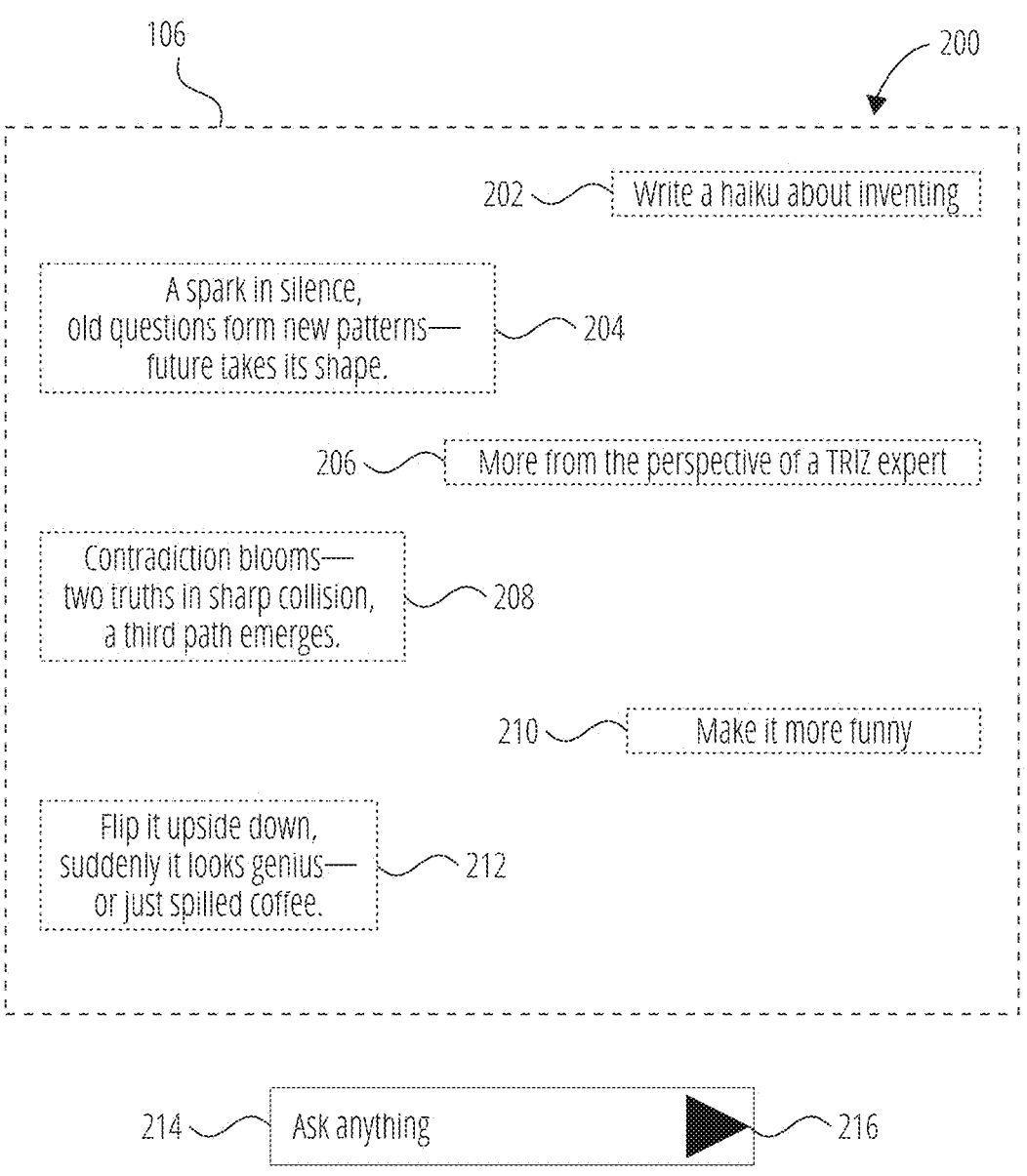
FIG. 2 illustrates an example conversational user interface displaying a portion of a linear conversation between a user and a chatbot in accordance with one embodiment.

FIG. 2 illustrates an example conversational user interface 200 displaying a portion of a linear conversation 106 between user 108 and chatbot 112. In this example, the conversation 106 is already ongoing and includes multiple user prompts 202, 206, 210 and corresponding chatbot responses 204, 208, 212. The conversational user interface 200 also includes a text entry box 214 that the user 108 may use to input a new user prompt, and a submit button 216 for submitting the new user prompt to the chatbot 112.

In the illustrated conversation 106, the user 108 asks the chatbot 112 for a haiku about inventing in a first user prompt 202, and the chatbot 112 replies with a haiku in a corresponding first chatbot response 204. Then, the user 108 clarifies in a second user prompt 206 that the user 108 is interested in haikus from the perspective of a TRIZ expert, and the chatbot 112 replies with another haiku in a corresponding second chatbot response 208. Lastly, the user 108 tells the chatbot 112 in a third user prompt 210 to make the haiku more funny, and the chatbot 112 replies with yet another haiku in a third chatbot response 212.

Embodiments provide an advanced mechanism that manages non-linear dialogue flows, which will be described with reference to FIG. 3, which illustrates a method 300 for managing a non-linear conversation with the chatbot 112. In step 302, method 300 displays, on a conversational user interface 104, a conversation 106 between the user 108 and the chatbot 112. The conversation 106 comprises a plurality of user prompts and corresponding chatbot responses forming a first conversation path. In step 304, method 300 modifies, on the conversational user interface 104, a user prompt within the conversation 106 in response to a user request. In step 306, method 300 displays, on the conversational user interface 104, a chatbot response to the modified user prompt.

The chatbot response to the modified user prompt is displayed in a second conversation path separate from the first conversation path. Accordingly, the illustrated method 300 establishes creation of an alternative conversation path while preserving the original conversation path, thereby enabling non-linear exploration without overwriting prior conversation content.

FIG. 4 illustrates an example conversational user interface 400 displaying a portion of a non-linear conversation 106 between the user 108 and the chatbot 112. The example is the same as in FIG. 2 with the exception that the user 108 has modified the second user prompt 206 into a modified user prompt 402 which instructs the chatbot 112 that the user 108 would like to have haikus formulated more from the perspective of a patent attorney. The conversational user interface 400 displays a corresponding fourth chatbot response 404 with a corresponding haiku. The fourth chatbot response 404, i.e., the reply to the modified user prompt 402, is displayed in a second conversation path separate from the first conversation path.

By forking the conversation 106 into a first conversation path and a second conversation, a non-linear conversation flow is created allowing the user 108 to explore both conversation paths simultaneously.

In the illustrated embodiment, the fourth chatbot response 404 has been appended to the modified user prompt 402.

In the illustrated embodiment, the first conversation path and the second conversation path are displayed simultaneously on the conversational user interface 400. Accordingly, it is possible for the conversational user interface 104 to present both the original sequence of user prompts and chatbot responses, as well as the alternative sequence resulting from the modification of a user prompt, at the same time. This simultaneous display can be realized, for example, by arranging the conversation paths in parallel columns, in a branching tree structure, or in separate panels within the same interface.

Presenting both conversation paths concurrently can allow users to compare the original and modified dialogues side by side. This arrangement may assist users in understanding how changes to a user prompt influence the chatbot's responses and the overall flow of the conversation. In certain implementations, the interface could visually distinguish the different paths using colour coding, labels, or graphical connectors, thereby enhancing clarity and navigation between the conversation branches.

In the illustrated embodiment, the conversation 106 shows both the original user prompt 206 and the modified user prompt 402. In alternative embodiments, the original user prompt 206 may be replaced by the modified user prompt 402.

In the illustrated embodiment, the first conversation path and the second conversation path are both displayed in an expanded state. Displaying the conversation paths in an expanded state may mean that all user prompts and corresponding chatbot responses along each path are simultaneously visible to the user, without the need for additional user interaction to reveal hidden or collapsed portions of the dialogue. This approach can allow users to view the full sequence of exchanges in each conversation path at a glance, thereby facilitating comparison between the original and modified dialogues. The expanded presentation may be particularly advantageous in scenarios where users wish to analyse the differences between conversation branches or trace the flow of the conversation in detail.

Figure 5:
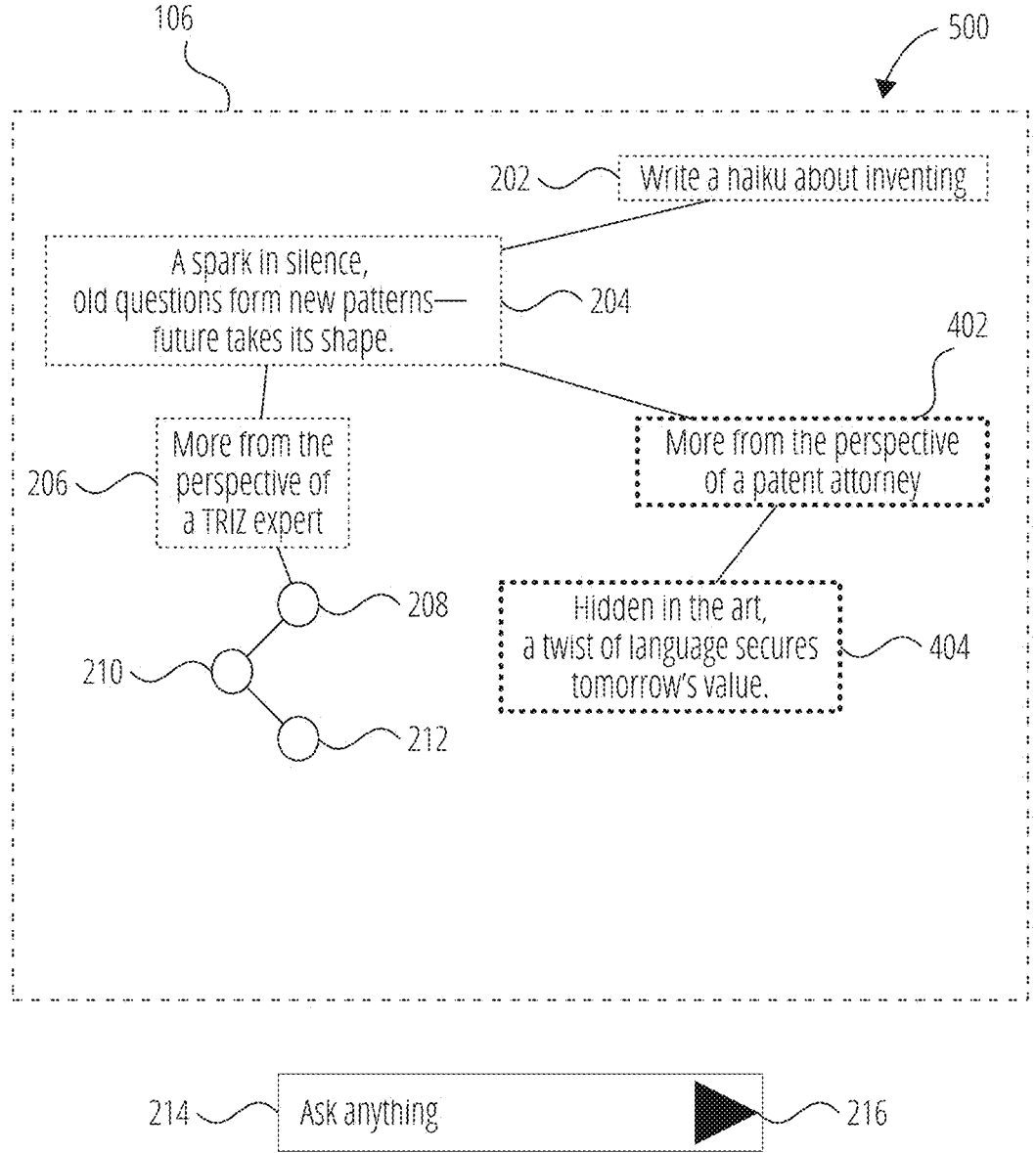
FIG. 5 illustrates an example conversational user interface displaying a portion of a non-linear conversation with a collapsed conversation path and an expanded conversation path in accordance with one embodiment.

Alternatively, the user interface might provide options for expanding or collapsing individual conversation paths, or segments thereof, enabling users to focus on specific parts of the dialogue as needed. In such embodiments, the method 300 may further comprise transferring a display of the first conversation path to a collapsed state while the second conversation path is displayed in an expanded state. An example is shown in FIG. 5 which illustrates an example conversational user interface 500 displaying a portion of the non-linear conversation 106 in which a segment of the first conversation path has been collapsed and the second conversation path is expanded.

In embodiments, the conversational user interface can be configured such that, upon user selection or automatically in response to certain actions, the original conversation path is minimized or hidden from view, showing only a summary or a single representative element, such as the initial user prompt or a branch point. At the same time, the alternative conversation path, which results from a modification to a user prompt, may remain fully visible in an expanded state, with all associated user prompts and chatbot responses displayed. This arrangement can be advantageous in situations where the user wishes to focus attention on the modified conversation path without distraction from the original dialogue. By collapsing the first conversation path, the interface may reduce visual clutter and make it easier to analyze or interact with the second, expanded path. The system may provide controls or options for toggling the display state of each conversation path, allowing users to collapse or expand paths as needed according to their preferences.

Alternatively, the interface might automatically collapse the first conversation path when a modification is made and a new branch is created, or it could prompt the user to choose which paths to display in expanded or collapsed form. In some implementations, the collapsed state may be indicated by a graphical icon, a summary line, or a clickable element that can be expanded again if the user wishes to revisit the original conversation flow.

Providing the ability to selectively collapse and expand conversation paths can enhance the usability of the system, particularly in complex or lengthy dialogues where multiple branches may be present. This feature may also support improved navigation and comparison between different conversational outcomes, as users can quickly switch focus between various paths without losing context.

In the illustrated embodiment, the first conversation path and the second conversation path are displayed as a tree structure within the conversational user interface. The conversation may be visualized such that each user prompt and corresponding chatbot response forms a node or branch in the tree, with subsequent modifications or alternative prompts giving rise to new branches diverging from earlier points in the dialogue. This tree-based representation may allow users to intuitively follow the progression of the conversation, including any non-linear developments resulting from modifications to previous prompts.

The tree structure can be implemented in various ways. For example, the root of the tree may correspond to the initial user prompt, with each subsequent prompt and response forming child nodes. When a user modifies a previous prompt, a new branch may be created from the relevant node, representing the alternative conversation path. In some implementations, the user interface might visually distinguish different branches using lines, connectors, or colour coding, thereby enhancing the clarity of the conversation's structure.

Optionally, the tree structure may be interactive, enabling users to expand or collapse branches, navigate between different conversation paths, or select specific nodes to view detailed information about the corresponding prompts and responses. This approach can facilitate the exploration of multiple conversational outcomes and provide a clear overview of how the dialogue evolves in response to user modifications.

Alternatively, the tree structure may be presented alongside other visualizations, such as linear or column-based layouts, allowing users to choose their preferred method of viewing the conversation. The use of a tree structure for displaying conversation paths is particularly advantageous in applications where tracking the relationships between different dialogue branches is important, such as in decision support systems, educational tools, or interactive storytelling platforms.

Figure 6:
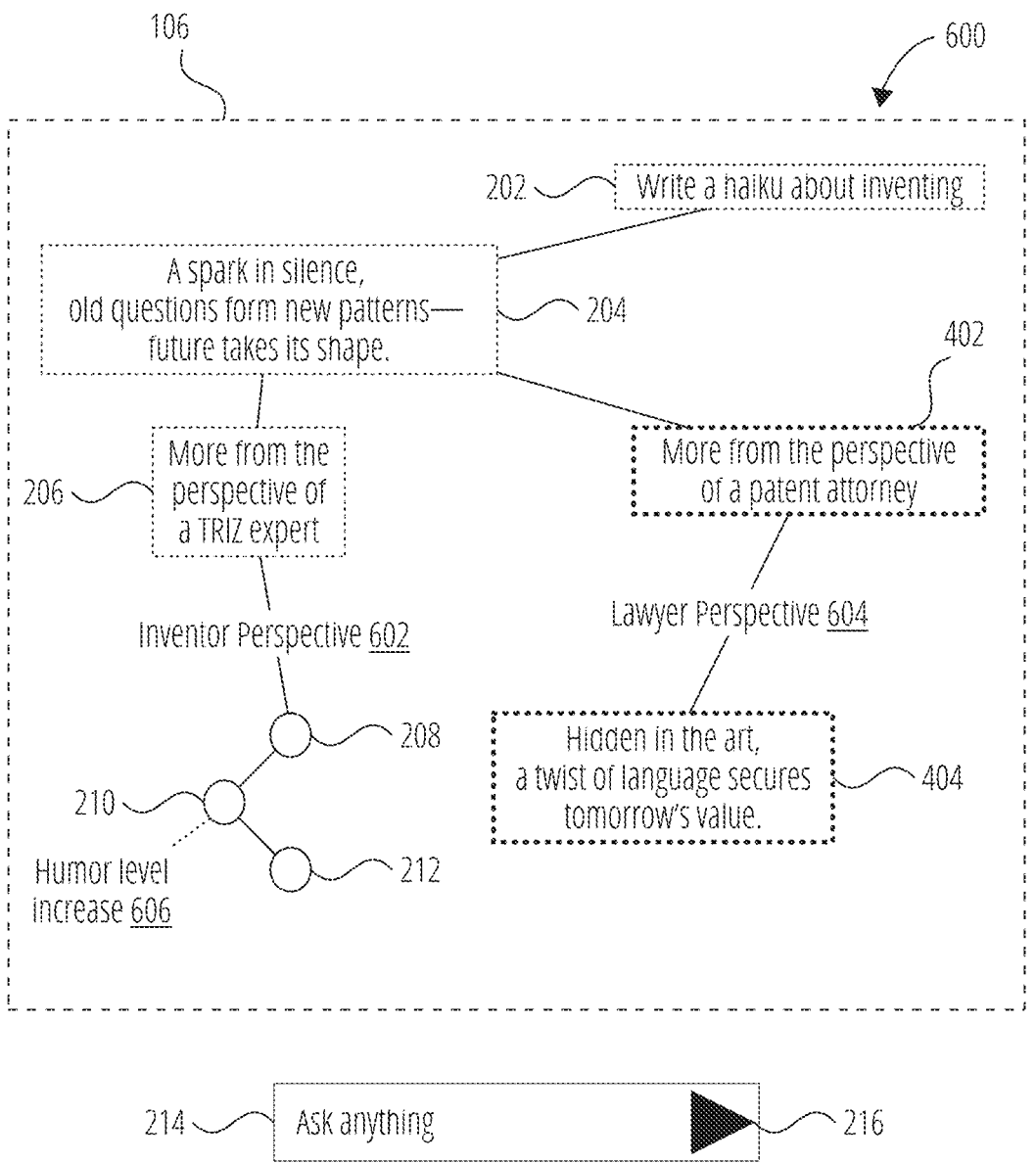
FIG. 6 illustrates an example conversational user interface displaying a portion of a non-linear conversation with labels in accordance with one embodiment.

In embodiments, the method 300 may further comprise displaying, on the conversational user interface 104, at least one first label associated with the first conversation path, at least one second label associated with the second conversation path, or both. An example is shown in FIG. 6 which illustrates an example conversational user interface 600 displaying a portion of the non-linear conversation 106 in which the first conversation path is associated with a first label 602 and the second conversation path is associated with a second label 604. Furthermore, the node 210 is associated with a third label 606.

The use of such labels can be implemented in a variety of ways. For example, a first label might be presented adjacent to or within the visual representation of the first conversation path, while a second label could be similarly associated with the second conversation path. These labels may serve to identify, distinguish, or provide additional context for each conversation path, thereby enhancing the clarity and usability of the interface.

It is possible for the labels to comprise textual identifiers, such as "Original Path," "Alternative Path," or user-defined names, which can assist users in recognizing the purpose or origin of each path. Alternatively, the labels may include icons, color codes, timestamps, or other graphical elements that visually differentiate the conversation paths. In certain implementations, the system might allow users to customize the labels, for instance by entering descriptive text or selecting from a predefined list of options.

Optionally, the labels can be interactive, enabling users to select a label in order to navigate directly to the corresponding conversation path or to access additional information about that path. In some cases, the interface may display both the first and second labels simultaneously, or may present only one label at a time depending on the current focus or display mode. The association of labels with conversation paths can be realized in a variety of layouts, such as positioning the labels at the top of each path, alongside individual prompts and responses, or within a navigation pane.

Providing labels for conversation paths may be particularly advantageous in scenarios involving multiple branches or complex dialogues, as it can help users keep track of different conversational outcomes and facilitate efficient navigation between paths. However, it is also conceivable for the system to operate without such labels, or to employ alternative mechanisms for distinguishing between conversation paths, depending on user preferences or application requirements.

In embodiments, at least one of the first label 602, the second label 604 or the third label 606 may be a chatbot-generated label. For example, the system may be configured so that, upon the creation of a new conversation path or branch, the chatbot analyzes the content or context of the conversation and proposes a suitable label for that path. This chatbot-generated label may reflect the subject matter, intent, or distinguishing feature of the conversation branch, such as summarizing the user's modified prompt or highlighting a key topic discussed in that path.

Alternatively, the chatbot-generated label could be based on predefined templates or rules, where the chatbot selects or constructs a label according to the type of modification made, the user's input, or the outcome of the chatbot's response. In some cases, the label might include a brief summary, a suggested title, or a categorization that assists the user in quickly identifying the nature of the conversation path. For instance, the chatbot might generate labels such as "Clarification Requested," "Alternative Solution," or "Follow-up Question," depending on the context of the modification.

In embodiments, at least one of the first label 602, the second label 604 or the third label 606 may be a user-generated label. For example, the system may allow a user to manually assign a label to a conversation path, either at the time the path is created or at any subsequent point during the interaction. The user-generated label may comprise a textual identifier, such as a descriptive title, a summary of the conversation branch, or any other notation that the user finds helpful for distinguishing between different paths.

Alternatively, the interface can provide an option for the user to edit or overwrite an existing label, including those that may have been automatically generated by the system or the chatbot. In this way, users may personalize the labelling of conversation paths according to their own preferences, workflow, or organizational needs. The user-generated label might be entered via a dedicated input field, a dialog box, or an inline editing feature within the conversational user interface.

It is also conceivable for the system to offer both chatbot-generated and user-defined labels, allowing users to accept, edit, or replace the automatically generated label as desired. In certain implementations, the chatbot-generated label may be presented as a default, which the user can subsequently customize for greater clarity or personal preference. The use of chatbot-generated labels may enhance the usability of the conversational user interface by providing immediate, contextually relevant identifiers for each conversation path, particularly in scenarios involving multiple branches or complex dialogues.

However, it should be noted that the generation of labels by the chatbot is not mandatory, and in some variants, all labels may be provided solely by the user or by another component of the system. The option to employ chatbot-generated labels may be enabled or disabled according to system configuration, user settings, or application requirements. This flexibility allows the method to accommodate a range of use cases and user preferences regarding the labelling and organization of conversation paths within the interface.

In embodiments, the method 300 may further comprise maintaining distinct conversation contexts for the first conversation path and the second conversation path. It is possible for the system to manage separate conversational states or histories for each path, such that the chatbot's responses within one path are generated based on the unique sequence of prompts and responses specific to that path, rather than being influenced by the dialogue in another path. This separation of contexts can enable the chatbot to provide contextually appropriate and coherent responses in each conversation branch, even when the branches diverge from a common starting point.

Alternatively, the system might be configured to store and retrieve conversation context data independently for each path. For example, when a user modifies a previous prompt and initiates a new conversation branch, the system may create a new context instance that reflects the modified sequence of interactions. This approach can ensure that any subsequent user prompts or chatbot responses within the second conversation path are interpreted and generated with reference only to the information and history relevant to that path.

In some possible implementations, the maintenance of distinct conversation contexts may involve tracking variables, user preferences, or other state information separately for each path. This can be particularly advantageous in applications where the outcome of the conversation depends on accumulated context, such as in decision support, troubleshooting, or interactive storytelling scenarios. By preserving independent contexts, the system may allow users to explore alternative conversational outcomes without cross-contamination of information between branches.

It is also conceivable for the system to provide options for users to view, compare, or switch between the contexts associated with different conversation paths. In certain cases, the interface might display indicators or summaries of the current context for each path, thereby enhancing transparency and user control. However, the maintenance of distinct conversation contexts is not mandatory in all embodiments; in some variants, the system may instead employ a shared or partially shared context across multiple paths, depending on the desired functionality or application requirements.

In embodiments, the method 300 may further comprise receiving a user request to merge the second conversation path into the first conversation path, generating a merged conversation context, and displaying, on the conversational user interface 104, a subsequent chatbot response in a merged conversation path based on the merged context. For example, the conversational user interface can be configured to allow a user to select an option or activate a control for merging two conversation paths. This request may be initiated through various means, such as clicking a merge button, selecting both paths and confirming a merge action, or issuing a specific command within the interface. Upon receiving such a user request, the system can be adapted to generate a merged conversation context. The merged context may be created by combining the relevant conversational histories, user prompts, and chatbot responses from both the first and second conversation paths. Various strategies may be employed for merging the contexts, such as prioritising the most recent modifications, reconciling conflicting information, or integrating user-specified elements from each path. In some cases, the system might prompt the user to resolve ambiguities or select preferred responses where the conversation paths diverge.

Following the generation of the merged conversation context, it is possible for the method to include displaying, on the conversational user interface, a subsequent chatbot response in a merged conversation path based on the merged context. The merged conversation path may be presented as a new branch within the interface, visually distinct from the original and alternative paths, or it may replace one or both of the previous paths, depending on user preference or system configuration. The chatbot response generated in this merged path can take into account the combined information and context from both conversation branches, thereby providing a coherent continuation of the dialogue.

Alternatively, the interface may offer options for users to review or edit the merged context before proceeding, or to compare the merged path with the original conversation branches. In certain implementations, the merged conversation path may be labelled or annotated to indicate its origin, such as "Merged Path" or with a user-defined name. The ability to merge conversation paths and generate a unified context can be particularly advantageous in scenarios where users wish to consolidate insights, resolve divergent outcomes, or streamline the conversational flow after exploring multiple alternatives.

It should be noted that the merging of conversation paths is not a mandatory feature and may be provided as an optional tool within the system. The specific mechanisms for merging contexts, handling conflicts, and presenting the merged path can be adapted according to the requirements of the application and the preferences of the user.

In embodiments, generating the merged conversation context may comprise generating an automated summary of the second conversation path and injecting the summary into a conversation context of the first conversation path. For example, when a user requests to merge two conversation paths, the system can be configured to analyze the sequence of user prompts and chatbot responses within the second conversation path and automatically produce a condensed representation or summary of its content. This summary may capture key topics, decisions, or outcomes that occurred along the second path, and may be generated using natural language processing techniques, rule-based algorithms, or other summarization methods. The automated summary could then be injected, inserted, or otherwise integrated into the conversation context associated with the first conversation path. This integration may take various forms. In some cases, the summary might be appended as a distinct message or annotation within the conversation history, providing a concise overview of the alternative dialogue branch. Alternatively, the summary could be embedded at a specific point in the conversation, such as immediately following the divergence between the first and second paths, or at a user-selected location.

By incorporating a summary of the second conversation path into the context of the first, the system may enable the chatbot to reference or take into account information from both paths when generating subsequent responses. This approach can be particularly useful in situations where the user wishes to consolidate insights or outcomes from an alternative branch without merging every individual prompt and response. The summarization process may be fully automated, or the system may offer the user an opportunity to review, edit, or approve the generated summary before it is added to the conversation context.

Optionally, the user interface may display the injected summary in a visually distinct manner, such as with a different font, color, or label, to indicate its origin as a summarized representation of another conversation path. In some implementations, the system could allow users to select the level of detail included in the summary, or to choose between multiple summarization strategies depending on their preferences or the complexity of the conversation.

The use of automated summaries for merging conversation contexts may enhance the clarity and manageability of non-linear dialogues, especially in applications where users explore multiple conversational outcomes and wish to retain relevant information from alternative branches. However, it is also conceivable for the system to support other methods of merging contexts, such as direct concatenation of conversation histories or selective inclusion of specific prompts and responses, depending on the requirements of the application and the needs of the user.

In embodiments, the user request to merge may be received via a drag-and-drop operation of a user prompt or a chatbot response from the second conversation path to the first conversation path on the conversational user interface. For example, it is possible for the interface to support functionality whereby a user can select a user prompt or a chatbot response from the second conversation path and drag it to a location within the first conversation path. Upon completion of this drag-and-drop action, the system may interpret the operation as a request to merge the two conversation paths, thereby initiating the process of generating a merged conversation context as previously described.

Alternatively, the drag-and-drop operation could involve moving an entire segment or branch of the conversation, rather than a single prompt or response. In certain implementations, the interface might provide visual cues, such as highlighting or animation, to indicate that a merge action is available when a prompt or response is dragged over a compatible location in another conversation path. The user may be able to drop the selected element at any point within the first conversation path, allowing for flexible integration of content from the second path.

It is also conceivable that the system could offer additional options or confirmation prompts following the drag-and-drop action, enabling the user to review or adjust the merged conversation context before finalizing the merge. In some variants, the drag-and-drop feature may be complemented by other methods of initiating a merge, such as context menus, keyboard shortcuts, or dedicated merge buttons, providing users with a range of interaction possibilities.

The use of a drag-and-drop operation for merging conversation paths can enhance the intuitiveness and efficiency of the user interface, particularly in applications where users frequently explore and consolidate multiple dialogue branches. However, it should be noted that this approach is not mandatory, and other mechanisms for requesting a merge may also be supported, depending on user preference or system configuration. The drag-and-drop functionality may be enabled or disabled according to the needs of the application or the complexity of the conversational environment.

In embodiments, the method may further comprise receiving a user selection to exclude selected user prompts or chatbot responses from a current conversation context, and generating a subsequent chatbot response based only on included prior user prompts and chatbot responses. For example, the conversational user interface may provide functionality that allows a user to indicate, mark, or otherwise select specific prompts or responses within the ongoing conversation that are to be omitted from consideration in subsequent chatbot interactions. This selection process may be realized through various means, such as checkboxes, context menus, right-click actions, or dedicated exclusion controls adjacent to each prompt or response.

Alternatively, the interface might support bulk selection or filtering options, enabling users to exclude multiple prompts or responses at once, or to specify exclusion criteria based on content, timestamp, or other attributes. The exclusion of certain conversation elements may be visually indicated within the interface, for instance by greying out, striking through, or otherwise distinguishing the excluded items from those that remain active in the conversation context.

Following the user's selection of prompts or responses to be excluded, the system may be configured to generate a subsequent chatbot response based only on the prior user prompts and chatbot responses that have not been excluded. In this way, the chatbot's understanding of the conversation and its response generation process can be dynamically adapted to reflect only the included elements, effectively allowing the user to tailor the context considered by the chatbot at any given point.

This capability may be particularly advantageous in scenarios where users wish to disregard irrelevant, erroneous, or outdated parts of the conversation, or to explore how the chatbot would respond under alternative contextual assumptions. In some possible implementations, the system could provide feedback or a summary indicating which elements are currently included or excluded from the active context, thereby enhancing transparency and user control.

It is also conceivable for the interface to allow users to reverse or modify their exclusion selections at any time, restoring previously excluded prompts or responses to the conversation context as needed. The exclusion feature may be offered as an optional tool, and its use may be entirely at the discretion of the user. In certain variants, the system might support additional options, such as saving or labelling different context configurations, or comparing chatbot responses generated from alternative sets of included conversation elements.

Overall, the ability to selectively exclude user prompts or chatbot responses from the current conversation context can provide users with greater flexibility in managing non-linear dialogues and exploring multiple conversational outcomes within the same interface.

In embodiments, the method may further comprise displaying a navigable timeline slider representing the conversation, the timeline slider comprising nodes for the first conversation path and the second conversation path. It is possible for the timeline slider to visually distinguish between different conversation paths, for example by using separate branches, color coding, or distinct node shapes for each path.

The slider can be configured to navigate the display to any user prompt or chatbot response on any conversation path. Accordingly, the timeline slider may be interactive, allowing users to navigate to any point in the conversation by selecting or dragging to a particular node. In this way, a user could quickly access any user prompt or chatbot response on any conversation path, facilitating efficient review and exploration of the dialogue history. The slider might support various navigation mechanisms, such as clicking on individual nodes, dragging a handle along the timeline, or using keyboard shortcuts to move between nodes.

Alternatively, the timeline slider could be designed to expand or collapse segments of the conversation, enabling users to focus on specific branches or to obtain a high-level overview of the entire conversation structure. In some implementations, hovering over or selecting a node may display additional information, such as the full text of the prompt or response, timestamps, or associated labels. The timeline slider may also be synchronised with the main conversation display, so that navigating to a node on the slider automatically scrolls or highlights the corresponding exchange in the main interface.

It is also conceivable for the timeline slider to include filtering or search functionality, allowing users to locate particular prompts, responses, or conversation paths based on keywords, participants, or other criteria. In certain variants, the timeline slider may be positioned at the top, bottom, or side of the conversational user interface, or may be presented as a floating or collapsible element that can be shown or hidden according to user preference.

Providing a navigable timeline slider as part of the conversational user interface can enhance the usability of the system, particularly in scenarios involving lengthy or complex non-linear conversations. However, the inclusion and specific design of the timeline slider are not mandatory, and other navigation tools or visualizations may be employed as alternatives or in addition to the slider, depending on the requirements of the application and the needs of the user.

In embodiments, the timeline slider may include a plurality of visual tick marks, each tick mark corresponding to one of a key message or summary within the conversation. These tick marks can serve as visual indicators along the slider, highlighting important points or summarized content within one or more conversation paths. For example, a tick mark might be positioned at a node representing a significant user prompt, a pivotal chatbot response, or a summarized segment of the dialogue. It is possible for the system to generate these tick marks automatically, for instance by identifying messages that meet predefined criteria for importance, such as user-labeled highlights, chatbot-generated summaries, or points of divergence between conversation paths. Alternatively, users may be permitted to manually assign tick marks to specific prompts or responses that they consider noteworthy or wish to revisit easily.

In some variants, the tick marks could be visually differentiated based on their type or origin. For instance, tick marks representing user-generated highlights might be displayed in one color, while those corresponding to automated summaries or key chatbot responses could appear in another. The interface may also provide tooltips, pop-up previews, or labels that appear when a user hovers over or selects a tick mark, offering additional context or a brief excerpt of the associated message or summary.

Optionally, the timeline slider may allow users to filter or navigate directly to tick-marked points, thereby facilitating rapid access to critical moments or summarized content within complex or branching conversations. In other implementations, the density or prominence of tick marks could be adjusted dynamically, for example by zooming in or out on the timeline or by applying user-defined filters to display only certain categories of key messages or summaries.

The inclusion of visual tick marks on the timeline slider can enhance the clarity and navigability of the conversational user interface, particularly in scenarios involving lengthy or non-linear dialogues. However, it should be understood that the use of tick marks is not mandatory, and the system may be configured to operate with or without this feature, depending on user preferences or application requirements.

In embodiments, the method may further comprise displaying a semantic map of the conversation. The semantic map may comprise a plurality of nodes clustered by topic. Each node may represent a group of related user prompts and chatbot responses from one or more conversation paths. It is possible for the semantic map to be generated automatically by analyzing the content of the conversation and identifying topics, keywords, or semantic relationships among the various exchanges. In certain implementations, nodes that share similar subject matter or intent may be grouped together, forming clusters that visually indicate the main themes or discussion areas present in the conversation. The clustering of nodes by topic can assist users in quickly identifying and navigating between different areas of interest or lines of inquiry within the dialogue.

Alternatively, the semantic map may allow for manual adjustment or user-driven organisation, enabling users to merge, split, or relabel clusters as desired. In some cases, the nodes within the semantic map could be interactive, permitting users to select a node in order to view the underlying user prompts and chatbot responses associated with that topic. The map may also support zooming, panning, or filtering functions, allowing users to focus on specific clusters or to obtain an overview of the entire conversational landscape.

The nodes themselves might be visually distinguished by colour, size, or shape, depending on factors such as the number of messages they contain, the recency of the discussion, or the importance of the topic as determined by the system or the user. In certain variants, the semantic map could be displayed alongside other conversation visualisations, such as tree structures or timeline sliders, providing multiple perspectives on the dialogue's structure and content.

Displaying a semantic map of the conversation can be particularly advantageous in scenarios involving complex or non-linear dialogues, as it may help users to comprehend the overall flow of topics, revisit specific areas of interest, or identify connections between different conversation paths. However, the inclusion of a semantic map is not essential in all implementations, and the method may be realized without this feature or with alternative forms of topic-based visualization, depending on the requirements of the application and the preferences of the user In embodiments, the method may further comprise receiving a user selection of two or more conversation paths, including the first conversation path and the second conversation path. This selection may be performed through various mechanisms, such as checkboxes, multi-select controls, or by clicking on visual representations of the conversation paths within the interface. The method may further comprise receiving a respective weight for each of the selected conversation paths, and generating a consensus chatbot response by synthesizing content from the selected conversation paths according to their respective weights. Accordingly, upon selection of multiple conversation paths, the system could prompt the user to assign a respective weight to each of the selected paths. The weights may be provided as numerical values, percentage allocations, or through an interactive slider or dial for each path. These weights can serve to indicate the relative importance, influence, or priority that the user wishes to assign to the content of each conversation path when generating a subsequent response.

Based on the selected conversation paths and their assigned weights, the method may further comprise generating a consensus chatbot response. This consensus response can be synthesised by the system using content from the selected conversation paths, with the synthesis process taking into account the respective weights provided by the user. Various algorithms or strategies may be employed to combine the information, such as weighted averaging of suggested responses, prioritization of content from higher-weighted paths, or blending of key elements from each path according to their assigned influence.

Optionally, the consensus chatbot response may be presented as a new branch or node within the conversational user interface, visually distinguished from the original conversation paths. In some implementations, the system might display an explanation or summary of how the consensus response was derived, including the weights used and the main contributions from each path. Alternatively, the user may be given the opportunity to review or edit the consensus response before it is finalized and displayed.

This approach can be particularly advantageous in scenarios where users wish to reconcile differing outcomes, perspectives, or information from multiple conversation branches, and to obtain a unified response that reflects their chosen priorities. However, it is not essential for every embodiment to include the weighting or consensus features, and the system may be configured to operate with or without these capabilities depending on user preference or application requirements. The method may also support alternative mechanisms for synthesizing responses from multiple conversation paths, such as simple selection, majority voting, or user-driven editing, in addition to or instead of weighted synthesis.

In embodiments, the method may further comprise displaying the consensus chatbot response with inline provenance indicators that link portions of the consensus response to their source conversation path. For example, it may be envisaged that, when a consensus response is generated by synthesizing content from multiple conversation paths, the conversational user interface can present the response in such a way that individual segments, phrases, or elements are annotated with visual indicators. These indicators may serve to identify the origin of each portion of the response, allowing users to trace specific content back to the conversation path from which it was derived.

The provenance indicators could take various forms. In some implementations, they might be realized as color-coded highlights, superscript symbols, footnotes, or interactive tooltips embedded within the text of the consensus response. Selecting or hovering over an indicator may reveal additional information, such as the name, label, or identifier of the source conversation path, a summary of the relevant dialogue, or a direct link to the corresponding segment within the original path. Alternatively, the provenance information could be displayed in a side panel, pop-up window, or as part of a summary section adjacent to the consensus response.

It is also conceivable that the system may allow users to customize the appearance or behavior of the provenance indicators, for instance by choosing different colors, icons, or annotation styles for each conversation path. In certain variants, the indicators might be automatically generated by the system based on the synthesis process, or users could be given the option to manually adjust or refine the provenance links if desired.

Providing inline provenance indicators can be particularly advantageous in scenarios where transparency and traceability of the consensus response are important. For example, users may wish to understand how differing perspectives or information from multiple conversation branches have contributed to the final response, or to verify the accuracy and relevance of specific content. However, it is not essential for every implementation to include inline provenance indicators, and the feature may be offered as an optional enhancement or configurable setting within the system. In some cases, the system might support alternative approaches to provenance tracking, such as generating a separate provenance report, displaying a summary of source contributions, or allowing users to toggle the visibility of provenance information according to their preferences.

In embodiments, the system may produce a plurality of alternative chatbot responses to a user prompt automatically and present each alternative in a respective, simultaneously visible conversation branch. In such automatic parallel response generation, the method may further characterize each alternative response by a distinct style parameter selected from a predefined set, optionally displaying a visual selector so the user may continue any one of the branches independently of the others. Upon detecting that a user prompt is open-ended, the system may generate three chatbot responses respectively tagged "formal," "creative," and "concise," shows them side-by-side, and allow the user to extend any chosen branch while retaining the unused branches for later selection.

In embodiments, the conversation paths may be visualized as a radial mind-map that emanates outward from an origin node representing the first prompt. Each subsequent user prompt or chatbot response may be plotted as a node positioned at an angular sector determined by its branch identifier and at a radial distance proportional to its sequence number within that branch. This radial mind-map conversation view may display divergence points as central hubs, connect descendant nodes with curved lines, and allow zoom-in gestures to expand a selected sector while automatically collapsing non-selected sectors, reducing visual clutter.

In embodiments, representing the conversation on a single chronological timeline while storing alternative prompts or responses for a given turn in vertically stacked layers at the same timestamp may serve as a layered timeline with alternative "takes". The interface may provide per-layer controls to solo, mute, lock, or delete a selected layer, letting the user curate a preferred linear presentation while preserving the alternatives. By default, one layer may be shown for each turn; additional layers may be collapsed behind a tab indicator. Selecting the indicator may reveal the alternatives in a panel resembling a multi-track video-editing interface, allowing the chosen layer to be exported as the "final cut" of the dialogue.

In embodiments, the system may allow insertion of an inline capsule that contains a sub-conversation decoupled from the main conversation context, referred to herein as "Capsule Threads Embedded in the Main Transcript." Each capsule may appear in the transcript as a single collapsed line that, when activated, opens a side panel showing the contained exchange. The content of the capsule may not influence the main branch unless explicitly merged. A user may select a sentence within the main transcript, choose "open capsule," and conduct up to ten back-and-forth turns with the chatbot in a side panel. Upon closing, the capsule may compress to an icon with a pinned excerpt and an unread-count badge.

Figure 7:
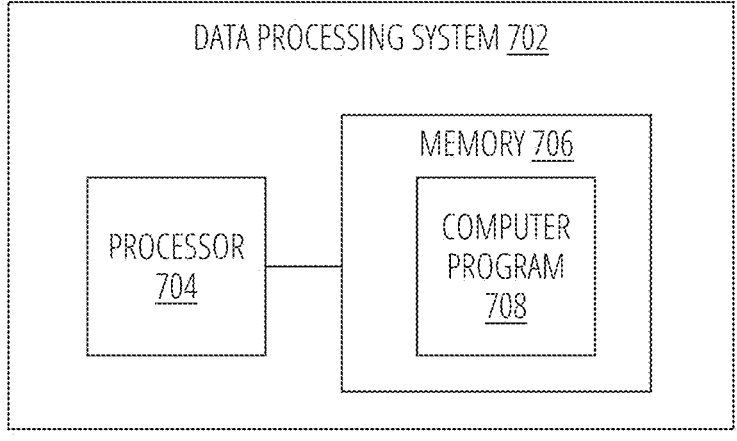
FIG. 7 illustrates a schematic block diagram of computer hardware on which embodiments of the present disclosure can be implemented.

FIG. 7 illustrates a schematic block diagram of computer hardware on which embodiments of the present disclosure can be implemented. As can be seen, a data processing system 702 comprises one or more processors 704 and a memory 706. The one or more processors 704 are communicatively coupled to the memory 706. The memory 706 stores a computer program 708. The computer program 708 may implement some or all aspects of the disclosed methods and functionalities.

Example 1: Multi-Modal Branched Conversations with Cross-Branch Asset Utilization In this example, an enhanced implementation of the non-linear conversation system supports multi-modal content in branched conversations, including images, audio clips, videos, and interactive elements. When a user engages in a conversation about interior design, they upload photos of their living room, and the system incorporates these images into the conversation context. As the user creates a branch to explore different color schemes, the original images are automatically carried over to the new branch but are now processed with real-time color overlays showing the alternate designs. Each branch maintains separate collections of generated design assets, but the system implements an "asset library" feature that allows elements from any branch to be reused across the conversation. For example, when the user creates a third branch focusing on furniture arrangement, they can access a gallery showing all images from all branches and select specific items to incorporate into the current context. The system tracks asset provenance and maintains a graph-based representation of where each element originated and how it has been modified across branches. This multi-modal branching reduces design iteration cycles significantly compared to linear conversation approaches, as users can simultaneously develop and compare multiple concepts while sharing common elements. The system extends this capability to other media types, allowing audio samples in music composition branches and code snippets in programming assistance branches to be similarly tracked and reused across the conversation graph.

Example 2: Collaborative Team Branching with Role-Based Access Control

In this example, the system implements an enterprise-focused version supporting collaborative branched conversations where multiple team members interact with the same conversation graph but with role-based permissions and visibility controls. In a product development scenario, a team of eight people including designers, engineers, marketers, and executives use the system to explore product features and market positioning. The conversation begins with a common root, but team members create specialized branches focusing on their respective domains. The engineering team creates technical feasibility branches, while marketing develops positioning branches, and design explores aesthetic directions. The system maintains a unified conversation graph but implements role-based access controls allowing department heads to restrict certain branches to specific team members or departments. As the conversation evolves, the system provides specialized merging options for collaborative decision-making, including a "stakeholder voting" feature where team members can endorse specific branches or solutions, with voting results visualized directly on the conversation graph. A "branch diffing" tool highlights differences between approaches, automatically identifying points of consensus and contention. The collaborative system also implements "branch locking" to prevent modifications to finalized decisions while allowing continued exploration in open areas. Analytics dashboards provide metrics on branch creation patterns, team engagement, and decision progression. The collaborative branching approach reduces decision-making cycles significantly compared to traditional meeting-based approaches and increases cross-functional insight sharing.

Example 3: Temporal What-if Analysis with Counterfactual Branches and Scenario Modeling In this example, the system implements an advanced "what-if" analysis framework that extends branching conversations into sophisticated temporal modeling for business forecasting, scientific research, and policy planning. Users interact with a specialized version of the interface that adds simulation capabilities to the branching structure. In a business forecasting scenario, a financial analyst creates a baseline conversation branch discussing market projections, then spawns counterfactual branches representing different interest rate scenarios, supply chain disruptions, or competitor actions. Each branch not only maintains conversational context but also connects to a computational backend that adjusts financial models according to the assumptions in that branch. The system provides specialized visualization tools that plot quantitative outcomes across branches, such as revenue projections or cost models, allowing direct comparison of scenarios. A "sensitivity analysis" feature automatically creates multiple micro-branches with slight variations in key parameters to identify tipping points and critical thresholds. The temporal modeling capability includes "branch fusion" where the system can simulate the effects of one branch's assumptions being applied at different time points within another branch's timeline. For scientific research applications, the system integrates with external datasets and can generate branches that represent different experimental designs or parameter choices, with the ability to simulate expected outcomes based on existing research literature.

Example 4: Personalized Learning Pathways with Adaptive Branching and Skill-Based Progression In this example, the system implements an educational application of branched conversations that creates personalized learning experiences through adaptive path generation and skill-based progression tracking. A student engaging with the system on a complex topic like quantum physics begins with an assessment conversation that identifies their current knowledge level. As the conversation progresses, the system automatically generates branches representing different learning approaches tailored to the student's demonstrated comprehension patterns: one branch might emphasize visual explanations, another mathematical formalism, and a third practical applications. Unlike user-initiated branches, these system-generated learning paths are created through a specialized pedagogical model that maps concept dependencies and optimal learning sequences. The interface includes a "concept map" visualization showing the student's progress across different knowledge domains within the topic, with branches color-coded by mastery level. A "challenge branch" feature detects when a student is consistently demonstrating mastery and automatically generates a branch with more advanced material to test the boundaries of understanding. The system implements "learning reinforcement branches" that periodically split off from the main conversation to revisit earlier concepts in new contexts, supporting knowledge retention. For group learning environments, an "explanation sharing" feature allows students to bookmark effective explanations from their personal branches and share them with peers, creating a collaborative knowledge network that respects the non-linear nature of each student's learning journey. This adaptive branching approach improves concept retention significantly compared to linear explanations and increases engagement time.

Example 5: Cross-Reality Branched Conversations with Environment-Aware Context Switching In this example, the system extends branched conversations beyond traditional interfaces into mixed reality environments, implementing context-aware branching that spans virtual, augmented, and physical spaces. Users interact with the conversation system through a combination of voice commands, gesture controls, and traditional text input across different devices and reality contexts. A user planning a home renovation starts a conversation on their smartphone, creating initial branches exploring different design concepts. When they enter the relevant room, an augmented reality (AR) component activates, projecting virtual elements representing different branches onto the physical space. As the user walks through their home, the system automatically switches between conversation branches based on location context, showing kitchen renovation options in the kitchen and bathroom designs in the bathroom. The user creates new branches through gesture controls, "grabbing" elements from one design branch and "placing" them into another, with the system maintaining the logical conversation structure behind these spatial interactions. A "reality capture" feature allows real-world elements to be scanned and incorporated into the conversation context, with separate branches maintaining different virtual modifications to these physical objects. The system implements "cross-reality persistence," where branches created in one reality context (virtual, augmented, or physical) remain accessible when the user switches contexts, with appropriate rendering adaptations. For collaborative scenarios, multiple users can simultaneously interact with the same branched conversation graph from different locations and through different reality contexts, with the system handling appropriate perspective rendering and context synchronization. This approach reduces client decision-making time significantly compared to traditional design presentations and improves spatial understanding of proposed changes.

While various aspects and embodiments have been illustrated and described in detail in the foregoing description and the drawings, such illustration and description is illustrative or exemplary and not restrictive. Variations to the disclosed embodiments can be understood and effected by those skilled in the art in practicing the claimed subject-matter, from a study of the drawings, the disclosure, and the appended claims.

Although some aspects have been described in the context of a product, apparatus, device or system, these aspects also represent a description of the corresponding process, method or use, where a block or component corresponds to a method step or a feature of a method step. Analogously, aspects described in the context of a method step also represent a description of a corresponding block or component or feature of a corresponding product, apparatus, device or system.

The order of execution of the operations in the described embodiments is not essential, unless otherwise specified. That is, the operations may be performed in any order, unless otherwise specified, and embodiments may include additional or fewer operations than those mentioned.

In the claims, the word "comprising" does not exclude other elements or steps, and the indefinite article "a" or "an" does not exclude a plurality. A single entity may fulfill the functions of several entities recited in the claims. The mere fact that certain measures are recited in mutually different dependent claims does not indicate that a combination of these measures cannot be used to advantage. Any reference signs in the claims should not be construed as limiting the scope.

Embodiments of the present disclosure can be implemented in hardware, software, or both. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer-readable.

Embodiments of the present disclosure can be implemented on a computer system. The computer system may be a local computer device (e.g., personal computer, laptop, tablet computer or mobile phone) with one or more processors and one or more storage devices or may be a distributed computer system (e.g., a cloud computing system with one or more processors and one or more storage devices distributed at various locations, for example, at a local client and/or one or more remote server farms and/or data centers). The computer system may comprise any circuit or combination of circuits. In one embodiment, the computer system may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), or any other type of processor or processing circuit. Other types of circuits that may be included in the computer system may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system. Some or all of the method steps may be executed by (or using) a hardware apparatus, like for example, a processor, a microprocessor, a programmable computer or an electronic circuit. In some embodiments, some one or more of the described method steps may be executed by such an apparatus. A further embodiment is an apparatus as described herein comprising a processor and a storage medium.

Embodiments of the present disclosure can be implemented as a computer program (product) with a program code, the program code being operative for performing one of the methods when the computer program product runs on a computer. The program code may, for example, be stored on a machine-readable carrier. Other embodiments comprise a computer program for performing one of the methods described herein, stored on a machine-readable carrier. A further embodiment is a computer program having a program code for performing one of the methods described herein, when the computer program runs on a computer. A further embodiment is a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitory. A further embodiment is a computer having installed thereon the computer program for performing one of the methods described herein, or individual steps thereof.

A further embodiment is a data stream or a sequence of signals representing the computer program for performing one of the methods described herein. The data stream or the sequence of signals may, for example, be configured to be transferred via a data communication connection, for example, via the internet.

A further embodiment is an apparatus or a system configured to transfer (e.g., electronically or optically) a computer program for performing one of the methods described herein to a receiver. The receiver may, for example, comprise a computer, a mobile device, a memory device or the like. The apparatus or system may, for example, comprise a file server for transferring the computer program to the receiver.

The invention claimed is:

1. A computer-implemented method for managing a non-linear conversation with a chatbot, comprising:

displaying, on a conversational user interface, a conversation between a user and a chatbot, the displayed conversation comprising a plurality of displayed user prompts and corresponding displayed chatbot responses forming a first conversation path;

allowing the user to revisit and revise earlier parts of the conversation and non-destructively create a second conversation path separate from the first conversation path that coexists and is separate from the first conversation path so that the conversation has multiple paths that diverge from a common starting point;

wherein creation of the second conversation path: (1) automatically selects the second conversation path as an active conversation path, and a subsequent user prompt is appended to whichever conversation path is currently selected as the active conversation path until the user changes the selection via a path-selection control displayed on the conversational user interface; and (2) displays the second conversation path;

transferring a display of the first conversation path to a collapsed visual state while the second conversation path is displayed in an expanded visual state, wherein the collapsed visual state comprises displaying, instead of the user prompts and chatbot responses of a conversation path, a summary or a representative element that can be expanded again if the user wishes to revisit the first conversation path;

displaying, on the conversational user interface, a label associated with the second conversation path, wherein the label is a chatbot-generated label, wherein the chatbot-generated label reflects the subject matter of the second conversation path by highlighting a key topic discussed in that path, wherein the chatbot-generated label is user-customizable; and maintaining distinct conversation contexts for the first conversation path and the second conversation path.

2. The method of claim 1, wherein the first conversation path and the second conversation path are displayed simultaneously on the conversational user interface by rendering the paths in vertical, adjacent sequences within the conversational user interface, each sequence listing, in order, the user prompts and corresponding chatbot responses of the respective path.

3. The method of claim 1, wherein the first conversation path and the second conversation path are displayed in a tree structure, the tree structure comprising a root node corresponding to an initial user prompt of the conversation and a child node for each subsequent chatbot response and user prompt;

wherein the modified user prompt is visually arranged on a branch representing the second conversation path that extends from a branch representing the first conversation path and wherein the user interface visually distinguishes different branches using lines, connectors, color coding or a positioning of the user prompts and chatbot responses.

4. The method of claim 1, further comprising displaying both the first conversation path and the second conversation path in an expanded state.

5. The method of claim 1, wherein a conversation context comprises a set of background information, knowledge, or state associated with the corresponding conversation path, including one or more of a conversation's retained variables, topics, or prior discussion history that apply to the conversation path's subsequent chatbot responses.

6. The method of claim 1, further comprising:

receiving a user request to merge the second conversation path into the first conversation path;

generating a merged conversation context; and displaying, on the conversational user interface, a subsequent chatbot response in a merged conversation path based on the merged context.

7. The method of claim 6, wherein generating the merged conversation context comprises generating an automated summary of the second conversation path and injecting the summary into a conversation context of the first conversation path.

8. The method of claim 6, wherein the user request to merge is received via a drag-and-drop operation of a user prompt or a chatbot response from the second conversation path to the first conversation path on the conversational user interface.

9. The method of claim 1, further comprising:

receiving a user selection to exclude selected user prompts or chatbot responses from a current conversation context; and generating a subsequent chatbot response based only on included prior user prompts and chatbot responses.

10. The method of claim 1, wherein off-screen segments of the conversation paths are virtualized such that they are not rendered or transmitted until scrolled into view.

11. The method of claim 1, further comprising displaying a semantic map of the conversation, wherein the semantic map comprises a plurality of nodes clustered by topic, and wherein each node represents a group of related user prompts and chatbot responses from one or more conversation paths.

12. The method of claim 1, further comprising:

receiving a user selection of two or more conversation paths, including the first conversation path and the second conversation path;

receiving a respective weight for each of the selected conversation paths; and generating a consensus chatbot response by synthesizing content from the selected conversation paths according to their respective weights.

13. A data processing system, apparatus or device, comprising:

a display;

at least one processor; and a memory storing instructions that, when executed by the at least one processor, cause the system to:

display, on a conversational user interface, a conversation between a user and a chatbot, the displayed conversation comprising a plurality of displayed user prompts and corresponding displayed chatbot responses forming a first conversation path;

allow the user to revisit and revise earlier parts of the conversation and non-destructively create a second conversation path separate from the first conversation path that coexists and is separate from the first conversation path so that the conversation has multiple paths that diverge from a common starting point;

wherein creation of the second conversation path: (1) automatically selects the second conversation path as an active conversation path, and a subsequent user prompt is appended to whichever conversation path is currently selected as the active conversation path until the user changes the selection via a path-selection control displayed on the conversational user interface; and (2) displays the second conversation path;

transfer a display of the first conversation path to a collapsed visual state while the second conversation path is displayed in an expanded visual state, wherein the collapsed visual state comprises displaying, instead of the user prompts and chatbot responses of a conversation path, a summary or a representative element that can be expanded again if the user wishes to revisit the first conversation path;

display, on the conversational user interface, a label associated with the second conversation path, wherein the label is a chatbot-generated label, wherein the chatbot-generated label reflects the subject matter of the second conversation path by highlighting a key topic discussed in that path, wherein the chatbot-generated label is user-customizable; and maintain distinct conversation contexts for the first conversation path and the second conversation path.

14. A non-transitory computer-readable medium on which computer-executable instructions are stored to implement a method for managing a non-linear conversation with a chatbot comprising:

displaying, on a conversational user interface, a conversation between a user and a chatbot, the displayed conversation comprising a plurality of displayed user prompts and corresponding displayed chatbot responses forming a first conversation path;

allowing the user to revisit and revise earlier parts of the conversation and non-destructively create a second conversation path separate from the first conversation path that coexists and is separate from the first conversation path so that the conversation has multiple paths that diverge from a common starting point;

wherein creation of the second conversation path: (1) automatically selects the second conversation path as an active conversation path, and a subsequent user prompt is appended to whichever conversation path is currently selected as the active conversation path until the user changes the selection via a path-selection control displayed on the conversational user interface; and (2) displays the second conversation path;

transferring a display of the first conversation path to a collapsed visual state while the second conversation path is displayed in an expanded visual state, wherein the collapsed visual state comprises displaying, instead of the user prompts and chatbot responses of a conversation path, a summary or a representative element that can be expanded again if the user wishes to revisit the first conversation path;

displaying, on the conversational user interface, a label associated with the second conversation path, wherein the label is a chatbot-generated label, wherein the chatbot-generated label reflects the subject matter of the second conversation path by highlighting a key topic discussed in that path, wherein the chatbot-generated label is user-customizable; and maintaining distinct conversation contexts for the first conversation path and the second conversation path.

\* \* \* \* \*